United States Patent [19]

Iwamoto et al.

[11] Patent Number: 4,901,107

[45] Date of Patent: Feb. 13, 1990

[54] LENS REPOSITIONING DEVICE IN A COPIER

[75] Inventors: Ken Iwamoto, Nara; Masafumi Okumura, Yamatokoriyama; Tatsushi Hayashi, Nara, all of Japan

[73] Assignee: Sharp Kabushiki Kaisha, Osaka, Japan

[21] Appl. No.: 292,394

[22] Filed: Dec. 30, 1988

[30] Foreign Application Priority Data

Jan. 7, 1988 [JP] Japan .................................... 63-1635

[51] Int. Cl.[4] ............................................. G03B 27/52

[52] U.S. Cl. ........................................... 355/55; 355/56

[58] Field of Search ............................... 355/55, 56, 57

[56] References Cited

U.S. PATENT DOCUMENTS 4,552,450 11/1985 Tomosada et al. .................... 355/56
4,552,453 12/1985 Iwamoto et al. ...................... 355/57
4,676,632 6/1987 Arai ....................................... 355/56
4,796,053 1/1989 Nakamura et al. .
4,805,001 2/1989 Hayashi et al. .

FOREIGN PATENT DOCUMENTS 58-74260 5/1983 Japan .

*Primary Examiner*—Monroe H. Hayes
*Attorney, Agent, or Firm*—Birch, Stewart, Kolasch & Birch

[57] ABSTRACT

A lens repositioning device for use in a copying machine which device comprises a generally elongated lens carriage having a lens assembly fixedly mounted thereon; a single traction cable adapted to be driven by a drive unit and including generally intermediate first and second cable portions over the length thereof which extend parallel to each other and are, when the traction cable is driven by the drive unit, moved at the same velocity and in the same direction, and a guide member. The lens carriage is rigidly connected at its opposite ends with the respective first and second portions of the traction cable. The guide member is operable during the movement of the traction cable accompanied by the movement of the lens carriage to guide the lens assembly to follow a curved path of a predetermined configuration.

2 Claims, 3 Drawing Sheets

LENS REPOSITIONING DEVICE IN A COPIER

BACKGROUND OF THE INVENTION

1. Field of the Invention

The present invention generally relates to a copying machine of a type employing a movable optical system and, more particularly, to a lens repositioning device used in the copying machine for repositioning a lens assembly for the selection of one of copying magnification factor.

2. Description of the Prior Art

The prior art copying machine of a type employing the movable optical system, that is, in which the optical system including an illuminator, a reflecting mirror assembly and a projecting lens assembly are supported for movement so as to scan an original document to be copied, is illustrated in FIG. 4 of the accompanying drawings.

Referring first to FIG. 4, the copying machine comprises a document support 31 for supporting an original document 39 to be copied, which document 39 is scanned by an optical system. The optical system includes an illuminator lamp 32, a first reflecting mirror 33, a first reflecting mirror pair 34, a second reflecting mirror pair 36 and a second reflecting mirror 37, all of these mirrors 33 to 37 being so arranged as to direct the rays of light reflected from the original document 39 towards a photoreceptor drum 38 as will be described later. Specifically, the illuminator lamp 32 and the first mirror 33 are integrated together in a single carriage movable underneath the document support 31 for scanning the original document 39 placed on the document support 31. The first mirror pair 34 is also supported for movement in a direction parallel to the direction of movement of the carriage. The second reflecting mirror 37 is fixedly supported. Both of the lens assembly 35 and the second lens pair 36 are movably supported, however, they can be retained at a selected one of a plurality of positions during the scanning of the original document 39 while the movement of both of the lens assembly 35 and the second lens pair 36 take place only when the copying magnification at which an image of the original document 39 is desired to be copied is changed.

When the scanning of the original document 39 takes place, rays of light emitted from the illuminator lamp 32 sequentially and successively illuminate the original document 39 and are reflected thereby towards the first mirror pair 34 via the first mirror 33. The rays of light carrying an image of the original document 39 are then reflected back by the first mirror pair 34 towards the photoreceptor drum 38 through the lens assembly 35 by way of the second mirror pair 36 and then by way of the second mirror 37.

During this operation, the first mirror 33 integrated together with the illuminator 32 is driven in a scanning direction at a predetermined scanning speed whereas the first mirror pair 34 is driven in the same direction at a speed which is equal to half the predetermined scanning speed. Accordingly, the distance a of the path of travel of the rays of light from the original document 39 to the lens assembly 35 through the first reflecting mirror 33 and the first mirror pair 34 remains constant regardless of the position of the carriage relative to the original document 39. Also, the distance b of the path of travel of the rays of light from the lens assembly 35 to the photoreceptor drum 38 through the second mirror pair 36 and the second reflecting mirror 37 remains constant because, during the scanning operation, both the lens assembly 35 and the second mirror pair 36 are fixed. Thus, the distances a and b of the respective paths of travel of the rays of light have a predetermined relationship with respect to each other during the scanning of the original document 39.

It is to be noted that, in the copying machine of a type having a movable document support, the optical system does not move and, therefore, the distances a and b of the respective paths of travel of the rays of light are fixed to an equal length.

The reason why the distances a and b must have a predetermined relationship will now be discussed. Assuming that the image of the original document 39 is desired to be projected onto the photoreceptor 38 through the lens assembly 35, and assuming that the lens assembly 35 has a focal length f, the following relationship must be satisfied.

$$1/a+1/b=1/f \qquad (1)$$

If the focal length f of the lens assembly 35 is assumed to be fixed, the copying magnification m at which the image of the original document is projected by the lens assembly onto the photoreceptor drum 38 can be expressed as follows.

$$m=b/a \qquad (2)$$

Accordingly, in order for the equation (1) above to satisfied while the copying magnification m is retained at a constant value, the distances a and b must be held constant at respective values.

A method employed in this type of copying machine for changing the copying magnification m will now be described.

If the copying magnification m is x1, the following relationship establishes between the distances a and b in view of the equations (1) and (2) above.

$$a=b=2f \qquad (3)$$

Alternatively, if the copying magnification m changes, the distances a and b must be modified so as to satisfy the following relationship.

$$a=f(1+1/m) \qquad (4\text{-}1)$$

$$b=f(m+1) \qquad (4\text{-}2)$$

Thus, once the copying magnification m is chosen, the lens assembly 35 has to be moved so that the distance a of the optical path along which the rays of light travel from the original document 39 to the lens assembly 35 can satisfy the equation (4-1) and, at the same time, the second mirror pair 36 has to be moved so that the distance b of the optical path along which the rays of light travel from the lens assembly 35 to the photoreceptor drum 38 can satisfy the equation (4-2). It is to be noted that, where instead of the use of a combination of the second mirror pair 36 and the second reflecting mirror 37 a single reflecting mirror is employed for projecting the rays of light direct onto the photoreceptor drum 38, not only must the single reflecting mirror be moved, but the angle of inclination of the single reflecting mirror must also be adjusted.

Apart from the above, when it comes to the manner in which both an original document to be copied and a copying paper are set in the machine, a center-alignment method and a side-alignment method are well known. According to the center-alignment method, the original document 39 is required to be placed on the document support 31 with the center line of the original document 39 aligned with the center line of the document support 31 which extends along the scanning direction while the copying paper 40 is required to be set in the machine so that the center line of the copying paper 40 can align with the center line of the photoreceptor drum 48 intermediate the length of the photoreceptor drum 48. In the copying machine of the center-alignment system, even when the copying magnification m is changed, the optical center line of the image is aligned with the optical center line of the optical system at all times regardless of the size of any one of the original document 39 and the copying paper 40 and, therefore, it suffices for the lens assembly 35 to be moved straight along the optical axis of the optical system.

It is to be noted that the term "optical center line of the optical system" referred to above and hereinafter used is intended to means the imaginary line drawn on the optical path so as to extend between the center line of the document support 31 extending along the scanning direction and the center line of the photoreceptor drum 38 intermediate the length of such drum 38. It is also to noted that the term "optical center line of the image" also referred to above and hereinafter used is intended to means the imaginary line drawn on the optical path so as to extend between the center line of the document 39 extending along the scanning direction and the point of exposure on the photoreceptor drum which corresponds to the center line along a direction of conveyance of the copying paper 40.

In the center-alignment system, the optical axis of the lens assembly 35 must be aligned with the optical center line of the image at all times. However, it has been found that, according to the center-alignment system, and when the original document 39 is to be placed on the document support 31, an operator of the copying machine is required to place the original document 39 on the document support 31 with reference to scale calibrations so that the center line of the document 39 can be aligned with the center line of the document support 31. Thus, the center-alignment system has a problem in that the operator may endeavor to carefully place the original document on the document support.

In view of the foregoing, an increasing number of recent versions of the copying machine employ the side alignment system. The side-alignment system is such that, one of the opposite side edges of the document support 31 which extend along the scanning direction is used as a reference side edge against which a corresponding side edge of the original document 39 is abutted during the placement of the document 39 on the document support 31 and, in a similar manner, the copying paper 40 is set in the machine so that the copying paper 40 can be conveyed over the photoreceptor drum 38 with one side edge thereof aligned with one end portion of the photoreceptor drum 38, that corresponds to the reference side edge of the document support 31, regardless of the size of the copying paper.

In the copying machine employing the side-alignment system, since the placement of the original document on the document support can be accomplished merely by aligning one side edge of the original document against the reference side edge of the document support 39, the operator of the machine will not be burdened so much as with the copying machine employing the center-alignment system.

In the copying machine of the type employing the side-alignment system, when the copying magnification m is changed, the optical center line of the image will be no longer aligned with the optical center line of the optical system, and vice versa. Because of this, the movement of the lens assembly 35 straight along the optical center line of the optical system results in a deviation of the optical center line of the image from the optical axis of the lens assembly 35 and an electrostatic latent image corresponding to the image of the original document will be formed on the photoreceptor drum 38 in a biased fashion, that is, biased in the lengthwise direction of the photoreceptor. Consequently, the resultant copy will show the image reproduced on the copying paper 40 in the correspondingly biased fashion.

In view of the foregoing, in the copying machine of the type employing the side-alignment system, the lens assembly 35 when moved along the optical center line of the optical system has to be also moved in one plane in a direction perpendicular to the optical center line of the optical system so that the optical axis can be aligned with the optical center line of the image, as discussed in the Japanese Patent Publication No. 54-1178 published in 1979.

The manner in which the lens assembly 35 is moved when the copying magnification m is changed in the copying machine employing the side-alignment system will be discussed in detail with reference to FIG. 5. It is to be noted that, in FIG. 5, for the purpose of discussion, the optical center line of the optical system is depicted a extending in a plane and the copying paper 40 is assumed as being placed on the point of exposure on the photoreceptor drum 38.

It is assumed that, when the copying magnification m is chosen to be xl (equal size reproduction), the placement of the original document 31 with one side edge aligned with the reference side edge of the document support 39 and the subsequent positioning of the lens assembly 35 at a lens position Pa on the optical center line of the optical system would result in the reproduction of an equal size of the image on the copying paper 40*a* having one side edge aligned with one end of the photoreceptor drum 38. In such a case, the optical center line of the image and the optical center line of the optical system ar aligned with each other and are also aligned with the optical axis of the lens assembly 35 as clearly shown in FIG. 5. However, when the copying magnification is desired to be changed to ×0.8 (80% reproduction), the lens assembly 35 has to be moved a distance equal to 0.25f in a direction, shown by the arrow X in FIG. 5, along the optical center line of the optical system and close to the copying paper 40 to satisfy the equation (4) above. In such a case, since the copying paper 40*b* will be of a size 0.8 times the size of the copying paper 40*a*, the alignment of one side edge of the copying paper with the reference side edge of the document support 39 will result in a deviation of the center line of the copying paper from the optical center line of the optical system. Accordingly, the lens assembly 35 is required to be moved not only in a direction close to the copying paper, but also in a direction, shown by the arrow Y, perpendicular to the optical center line of the optical system. A symbol Pb shown in FIG. 5 represents the position assumed by the lens assembly 35 when the latter is so moved. Similarly, when the copying magnifications m are chosen to be ×0.6 and ×0.5, respectively, the lens assembly 35 is moved not only in the direction shown by the arrow X, but also in the direction shown by the arrow Y to respective lens positions indicated by Pc and Pd.

The distance between the original document 39 placed on the document support 31 and the copying paper 40 takes a minimum value when the distance a of the optical path and the distance b of the optical path shown in the equation (3) above coincide with each other. Because of this, the change of the copying magnification m results in the positioning of the copying paper 40*b*, 40*c* or 40*d* at a location spaced from the position of the copying paper 40*a* in the direction shown by the arrow X. The adjustment of the distance b of the optical path is accomplished by moving the second mirror pair 36 so as to satisfy the equation (4) above.

As clearly shown in FIG. 5, the lens positions Pa, Pb, Pc and Pd lie on a straight line. Because of this, assuming that the straight line passing through respective points closest to the lens positions Pa, Pb, Pc and Pd, when determined by the use of, for example, a method of least squares, extends in a direction shown by the arrow X' and inclined at an angle $\theta$ relative to the direction shown by the arrow X, even the movement of the lens assembly 35 in the direction shown by the arrow X', that is, along the straight line so determined, is not satisfactory and does not bring the lens assembly to the associated lens position Pa, Pc, Pc or Pd unless the lens assembly 35 is moved a slight distance in the direction shown by the arrow Y.

It is to be noted that, in FIG. 5, the original document 39 shown therein is assumed to be of a maximum size which the document support 31 can accommodate. Therefore, as far as the original document 39 of the maximum size is concerned, the alignment of one side edge of the original document with the reference side edge of the document support 31 results in the alignment of the center thereof with the optical center line of the optical system. However, where the original document 39 actually placed on the document support 31 is of a smaller size, the foregoing explanation can be equally applicable if one side of the original document is abutted against the reference side edge of the document support 31 during the placement of the original document on the document support.

From the foregoing reasoning, a lens repositioning system hitherto used in the copying machine of the type wherein the original document is laid on the document support with its one side held in abutting relation to the reference side edge of the document support 31 is so designed that the lens assembly 25 can be driven in a plane not only in the direction shown by the arrow X' and inclined relative to the optical center line of the optical system, but also in the direction perpendicular to the optical center line of the optical system.

Where the lens assembly 35 used in the machine is of a type wherein the focal length f is variable, that is, a zoom lens assembly, the position of the copying paper 40*a*, 40*b*, 40*c* or 40*d* in the direction shown by the arrow X may remain unchanged. However, the change of the copying magnification requires a corresponding adjustment of the focal length and, at the same time, the movement of the lens assembly 35. When it comes to the movement of the lens assembly 35 where the latter is a zoom lens assembly, the lens assembly 35 is required to be moved not only in the direction of the arrow X', but also in the direction of the arrow Y in a manner as hereinbefore discussed for the same reason as hereinbefore discussed.

The prior art lens repositioning mechanism for repositioning the lens assembly 35 in the manner as hereinbefore described such as disclosed in, for example, the U.S. Pat. No. 4,552,453, issued Nov. 12, 1985, is illustrated in FIG. 6, reference to which will now be made.

As shown in FIG. 6, the lens assembly 35 is rigidly supported by a generally elongated lens holder 41 which is in turn slidably mounted on a shaft 42 extending in a direction perpendicular to the optical axis of the lens assembly 35 and in the direction shown by the arrow Y. This lens holder 41 is displaceable in a direction along the shaft 42, however, it is normally biased by a spring member 43 in the direction of the arrow Y. The lens holder 41 has one of the opposite ends provided with a roller 44. Positioned on one side of the roller 44 opposite to the lens holder 41 is a guide bar 51 extending generally in the direction of the arrow X' while inclined at the angle 8 relative to the direction of the arrow X and also relative to the optical axis of the lens assembly 35. The guide track 51 is fixedly supported by a machine framework (not shown). At least one lateral surface of the guide track 51 which is held in contact with the roller 44 is not a straight surface and constitutes a cam surface so curved and so shaped as to permit the lens assembly 35 to assume selectively any one of the lens positions Pa, Pb, Pc and Pd discussed with reference to FIG. 5.

The shaft 42 referred to above is secured at its opposite ends to a lens drive member 45 having one end slidably mounted on a shaft 46 extending in a direction parallel to the direction of the arrow X'. The shaft 46 has its opposite ends rigidly secured to the machine framework (not shown) of the copying machine. The other end of the lens drive member 45 is provided with a roller 47 rotatably resting on a guide rail 48 extending parallel to the shaft 46. A traction cable 50 has its opposite ends rigidly secured to a cable fixture 49 extending outwardly from the end of the lens drive member 45 adjacent the shaft 46. A substantially intermediate portion of said cable 50 is turned around a drive shaft of a drive motor (not shown) through a number of idle pulleys (also not shown) so that during the operation of the drive motor the lens drive member 45 can be pulled by the traction cable 50 to move along the shaft 46.

The prior art lens repositioning mechanism of the construction shown in FIG. 6 operates in the following manner.

As the traction cable 50 is driven in one direction by the drive motor (not shown) when one of the available copying magnifications is selected, the lens drive member 45 having the cable fixture 49 connected to the traction cable 50 is driven along the shaft 46 in a direction dependent on the direction of rotation of the drive motor. As the lens drive member 45 is driven, for example, in the direction of the arrow X', the lens holder 41 is moved in the direction of the arrow Y along the shaft 42 with the roller 44 constantly held in contact with the cam surface of the guide rod 51 by the action of the spring 43. Thus, the movement of the lens drive member 45 in the direction of the arrow X' results in the movement of the lens holder 41 in the direction of the arrow Y.

In this way, the prior art lens repositioning mechanism is so designed and so structured as to permit the lens assembly 35 to be moved along a curved path containing the lens positions Pa, Pb, Pc and Pd.

It has, however, been found that the prior art lens repositioning mechanism has the following problem. The lens repositioning mechanism is of the construction wherein the lens holder 41 is slidably mounted on the shaft 42 which is in turn mounted on the lens drive member 45 slidably mounted the shaft 46 Therefore unless the mounting of these elements is carefully exercised, it would be difficult for the optical axis of the lens assembly 35 to be held in parallel relationship with the optical center line of the optical system at all times regardless of the displacement of the lens assembly. Therefore, the prior art lens repositioning mechanism requires a highly precise machining procedure to manufacture the various component parts and also a complicated assembling procedure.

Also, in the prior art lens repositioning mechanism, not only is the drive of the lens assembly 35 effected solely by he traction cable 50 having its opposite ends rigidly connected to the cable fixture 49 integral or fast with the lens drive member 45, but also the persistent alignment with the optical axis of the lens assembly 35 in a predetermined direction is achieved solely by the slidable mounting of the lens drive member 45 on the shaft 46. Because of this, it has been observed that the shaft 46 tends to be excessively loaded to such an extent that, after a long period of use, the lens drive member 45 may fail to operate properly and smoothly.

SUMMARY OF THE INVENTION

Accordingly, the present invention has been devised with a view to substantially eliminating the above discussed problems inherent in the prior art lens repositioning mechanism used in the copying machine and has for its essential object to provide an improved lens repositioning mechanism effective to ensure a stabilized and smooth movement of the lens assembly.

In order to accomplish the above described object, the present invention is directed to the copying machine of the side-alignment system wherein the original document to be copied is adapted to be laid on the document support with one side edge thereof held in abutting relationship with the reference side edge of the document support, and is featured in that the lens repositioning mechanism comprises a generally elongated lens carriage having the lens assembly mounted thereon, a drive means, a single traction cable adapted to be driven by the drive means and including generally intermediate first and second portions over the length thereof which extend parallel to each other and which, when the traction cable is driven by the drive means, moves at the same velocity in the same direction, said lens carriage being rigidly connected at its opposite ends with the respective portions of the traction cable, and a guide means operable during the movement of the traction cable accomplished by the movement of the lens carriage to guide the lens assembly to follow a curved path of predetermined configuration.

In this construction, when the traction cable travels, the lens carriage together with the lens assembly is moved linearly in a direction inclined relative to the optical axis of the lens assembly. At this time, since the first and second intermediate portions of the same traction cable are moved at the same velocity in the same direction, the lens assembly can move parallel to the optical axis thereof maintained in the predetermined direction. Also, since the traction cable is connected to the lens carriage at two points of connection, that is, the first and second intermediate portions of the traction cables are connected to the respective ends of the lens carriage, not only can the movement of the lens carriage h=stabilized, but also any one of the opposite end portions of the lens carriage will not be loaded.

The guide means is operable to regulate the position of the lens carriage and, hence, the lens assembly in a direction substantially perpendicular to the optical axis so that the lens assembly can be moved along the curved path of predetermined configuration. Because of this, the lens carriage, together with the lens assembly, can be moved by the traction cable in a direction inclined relative to the optical axis, and can be displaced in the direction perpendicular to the optical axis. The displacement of the lens assembly in the direction perpendicular to the optical axis takes place generally in a horizontal plane containing the optical axis. However, if desired, the guide means may b=constructed of a three-dimensional configuration so that the lens assembly can be displaced not only in the horizontal plane, but also in a plane other than the horizontal plane.

The displacement of the lens carriage and, hence, the lens assembly, induced by the guide means can be absorbed by the flexing or yield of the first and second intermediate portions of the traction cable. The curved path defined in the guide means is so configured and so designed that, depending on the selection of one of the available copying magnifications, the lens assembly can assume one of the specific lens positions which the lens assembly ought to occupy in the copying machine of the side-alignment system. The direction in which the first and second intermediate portions of the traction cable extend and which is inclined relative to the optical axis is generally parallel to the direction in which the curved path along which the lens carriage is moved. Where the traction cable is properly held taut in a predetermined direction, the amount of yield of the first and second intermediate portions of the traction cable which takes place during the displacement of the lens carriage and, hence, the lens assembly, is relatively small and, therefore, a precise movement of the lens assembly in the predetermined direction can be accomplished.

In the construction according to the present invention, the first and second intermediate portions of the traction cable serve to move the lens carriage in the inclined direction whereas the guide means serves to precisely reposition the lens assembly. Therefore, so far as the amount of travel of the traction cable is precisely controlled, the precise repositioning of the lens assembly can be achieved. In order for the amount of travel of the traction cable to be precisely controlled, it is a general practice to turn another intermediate portion of the traction cable between the first and second intermediate portions thereof around a drive drum rotatable together with the drive motor thereby to avoid any possible slippage of the traction cable relative to idle pulleys and, at the same time, to control the amount of travel of the traction cable in one of the directions opposite to each other. However, where the traction cable is employed in the form of a stainless steel wire around which a resin filament made of synthetic material such as, for example, polyurethane, is spirally turned over the entire length thereof, any possible slippage of the traction cable relative to the pulleys can be positively and effectively avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with a preferred embodiment thereof with reference to the accompanying drawings which are given by way of illustration only and thus are not limitative of the present invention, and in which.

DETAILED DESCRIPTION OF THE EMBODIMENT

Figure 1:
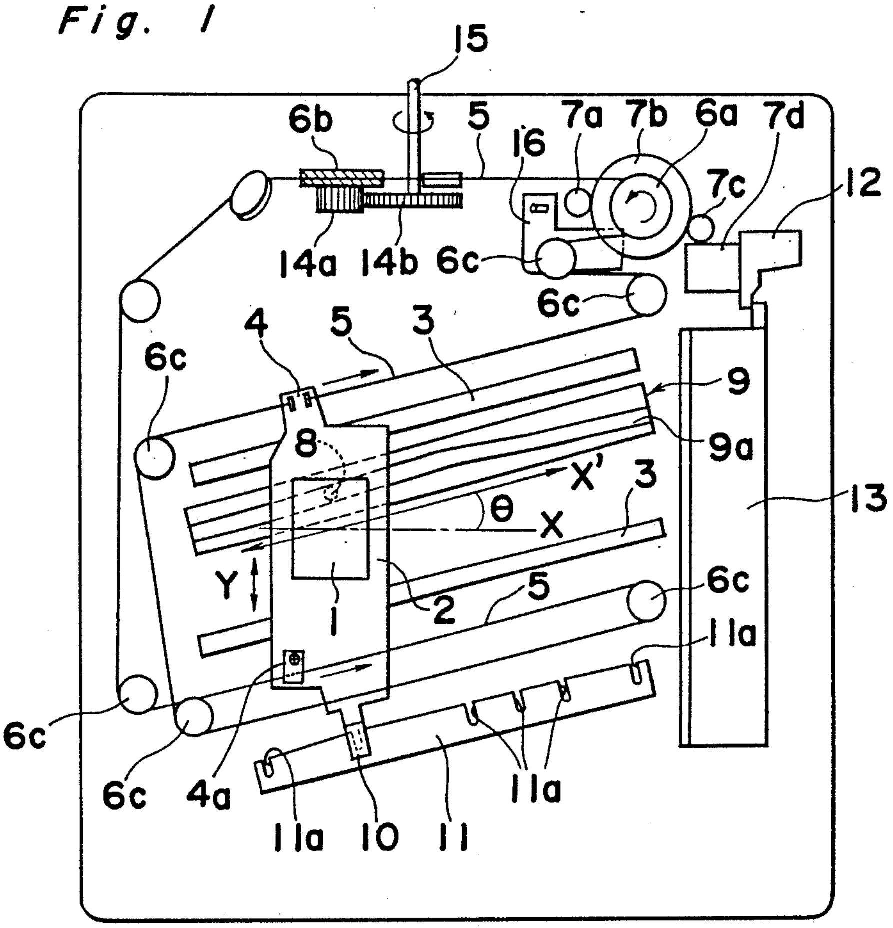
FIG. 1 is a schematic top plan view of a lens repositioning mechanism used in a copying machine according to a preferred embodiment of the present invention.
Figure 4:
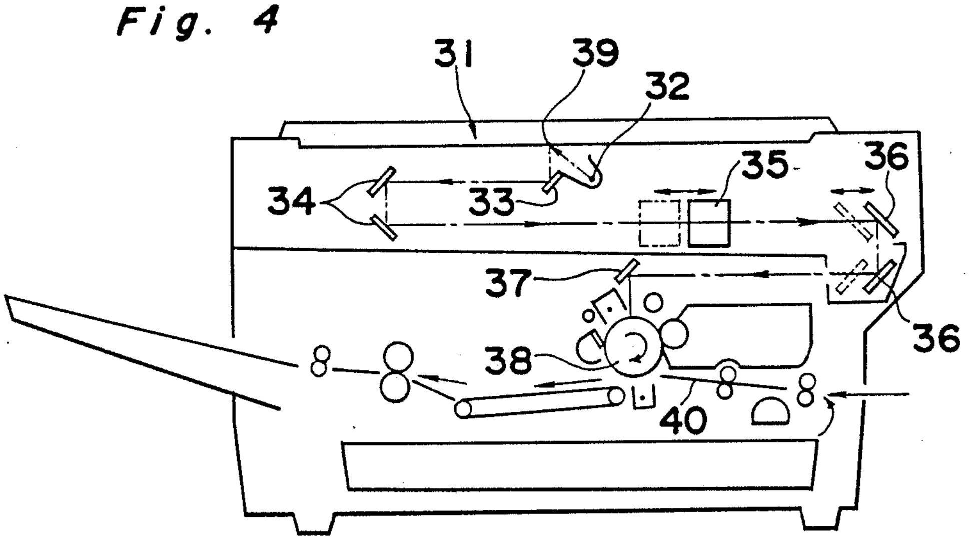
FIG. 4 is a schematic side view of the prior art copying machine, which is used to explain the manner in which the copying magnification is selected.

As hereinbefore discussed, the lens repositioning mechanism according to the present invention is so designed and so operable that, when one of the available copying magnifications is selected, the lens assembly generally identified by 1 can be moved in the direction of the arrow X' which is inclined at the angle $\theta$ relative to the optical axis X of the lens assembly 1 and, at the same time, displaced in the direction of the arrow Y perpendicular to the optical axis X of the lens assembly 1. As shown in FIG. 1, the lens assembly 1 is fixedly mounted on a generally rectangular lens holder 2 that is movably mounted on spaced apart rails 3 for sliding movement over the guide rails. The guide rails 3 are support members mounted on a machine framework (not shown) so as to extend in a direction parallel to the direction of the arrow X'. Opposite ends of the lens holder 2 which are spaced apart from each other in a direction parallel to the direction of the arrow Y are formed with cable fixtures 4 and 4*a*, respectively.

A traction cable 5 has its opposite ends rigidly connected to the cable fixture 4 while a substantially intermediate portion thereof is trained around a plurality of pulleys including a drive pulley 6*a* drivingly coupled with a drive motor (not shown) for rotation together therewith, a follower pulley 6*a* and idler pulleys generally identified by 6*c*. Considering the opposite ends of the traction cable 5 rigidly connected to the same fixture integral or fast with the lens holder 2, the traction cable 5 so trained is in the form of a generally endless cable. It is to be noted that some of the idle pulleys 6*c* are, as best shown in FIG. 1, so arranged and so positioned that the traction cable 5 can have generally intermediate, first and second portions which extend parallel to each other in a direction parallel to the direction of the arrow X' and which can, when the traction cable 5 is driven as will be described later, move in the same direction at the same velocity. In the illustrated embodiment, the first intermediate portions of the traction cable includes the opposite ends of the traction cable 5 rigidly connected to the cable fixture 4 whereas the second intermediate portion extends parallel to the first intermediate portion on one side of the lens holder 2 remote from the first intermediate portion and is rigidly anchored to the cable fixture 4*a*.

Figure 2:
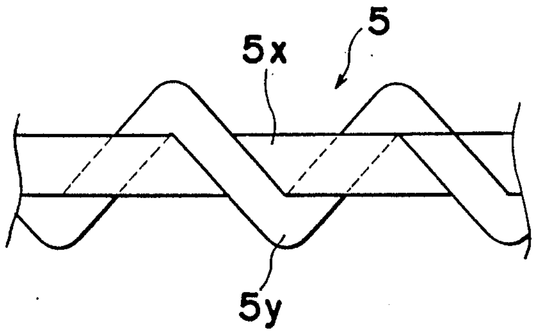
FIG. 2 is a schematic diagram, on an enlarged scale, showing a portion of a traction cable used in the lens repositioning mechanism.

The traction cable 5 is preferably employed in the form of a commercially available synchro-mesh rope of a type manufactured and sold by Asahi Mini-rope Kabushiki Kaisha and which is of a design comprising, as shown in FIG. 2, a stainless steel core wire 5*x* around which a polyurethane filament 5*y* is spirally turned over the length of the core wire 5*x*.

Figure 3:
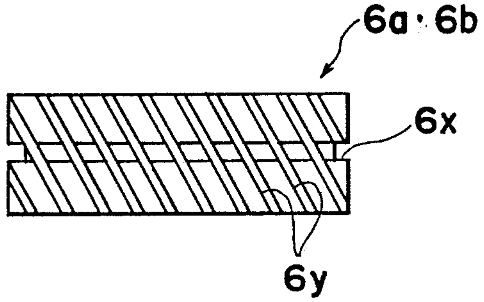
FIG. 3 is a schematic plan view of one of the idle pulleys used in the lens repositioning mechanism.
Figure 6:
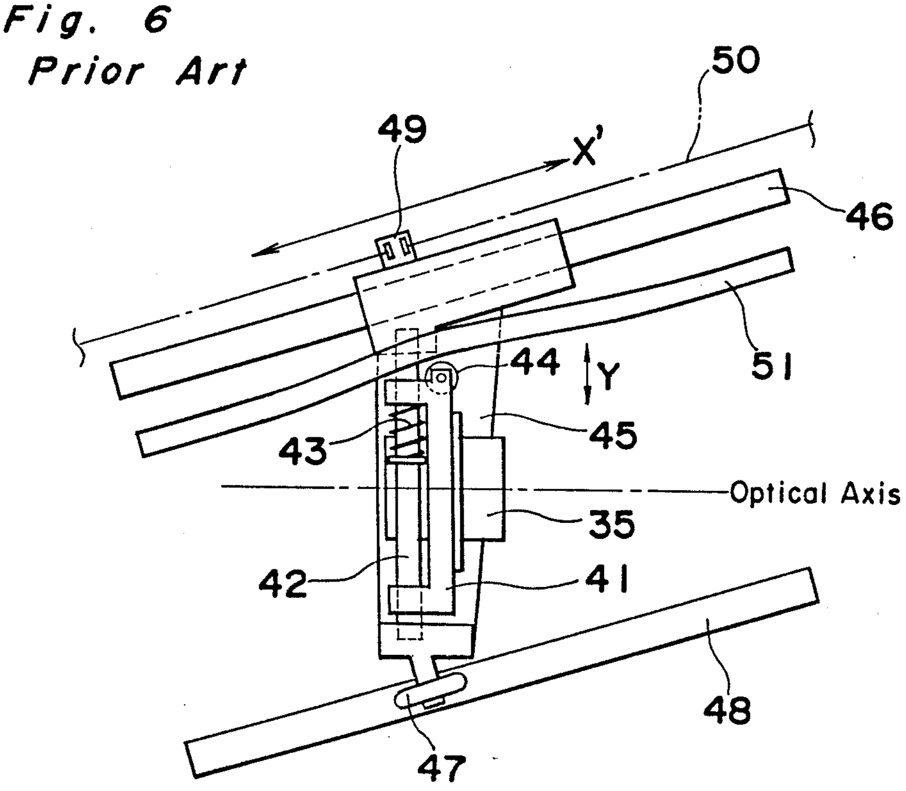
Fig. 6 Prior Art
FIG. 6 is a schematic top plan view, on an enlarged scale, showing the prior art lens repositioning mechanism used in the prior art copying machine.

Each of the drive pulley 6*a* and the follower pulley 6*b* is preferably of a design having, as best shown in FIG. 3, a peripheral face formed with a circumferentially extending center groove 6*x* and a plurality of transverse grooves 6*y* each inclined relative to the center groove 6*x* at a predetermined angle corresponding to the helix of the polyurethane filament 5*y* forming a part of the traction cable 5. With the use of this type of traction cable 5, it will readily be seen that, when the traction cable 5 is turned over each of the drive and follower pulleys 6*a* and 6*b*, the core wire 5*x* can be received in the center groove 6*x* while some convolutions of the polyurethane filament are received in the respective transverse grooves 6*y*. Accordingly, any possible slippage between the traction cable 5 and each of the drive and follower pulleys 6*a* and 6*b* can be positively and effectively avoided to ensure a positive and stabilized drive of the traction cable 5. Also, the use of the uniquely configured drive and follower pulleys 6*a* and 6*b* in combination with the unique traction cable is effective to eliminate the use of a drive drum on a drive shaft of a drive motor (not shown) around which, according to the prior art, the traction cable is turned in a few turns, and therefore, the assembly of the lens repositioning mechanism can be facilitated.

At least one of the idler pulleys 6*c*, for example, the idler pulley 6*c* arranged in the vicinity of the drive pulley 6*a*, is rotatably mounted on a tensioning plate 16 which is in turn adjustably mounted on the machine framework. Although not shown in detail, the tensioning plate 16 is to be understood as being capable of assuming one of a plurality of detent positions for the adjustment of and maintenance of the traction cable 5 under a predetermined tension.

The drive motor for driving the drive pulley 6*a* is preferably employed in the form of a stepper motor. The rotation of the stepper motor can be transmitted to a first gear 7*a*meshed with a second gear 7*b* coaxially mounted on a support shaft for rotation together with the drive pulley 6*a*. Accordingly, it will readily be seen that, during the rotation of the drive motor, the drive of the drive motor can be transmitted to the drive pulley 6*a* through the first and second gears 7*a* and 7*b* thereby to drive the traction cable 5.

In order for the traction cable 5 to have the first and second intermediate portions coupled respectively to the cable fixtures 4 and **4*b* as hereinbefore described, four of the idler pulleys 6*c* are required to be positioned on respective sides of the lens holder 2 in paired and spaced fashion while encompassing the space in which the lens holder 2 moves. As hereinbefore described, since the first and second intermediate portions of the traction cable 5 are rigidly connected to the respective cable fixtures 4 and 4*a*, the lens holder 2 with the lens assembly 1 mounted thereon can be moved in the direction of the arrow X' during the travel of the traction cable 5. For example, when the drive pulley 6*a* is driven in a counterclockwise direction as shown by the arrow in FIG. 1, the lens holder 2 can be moved diagonally upwardly as viewed in FIG. 1**.

Figure 5:
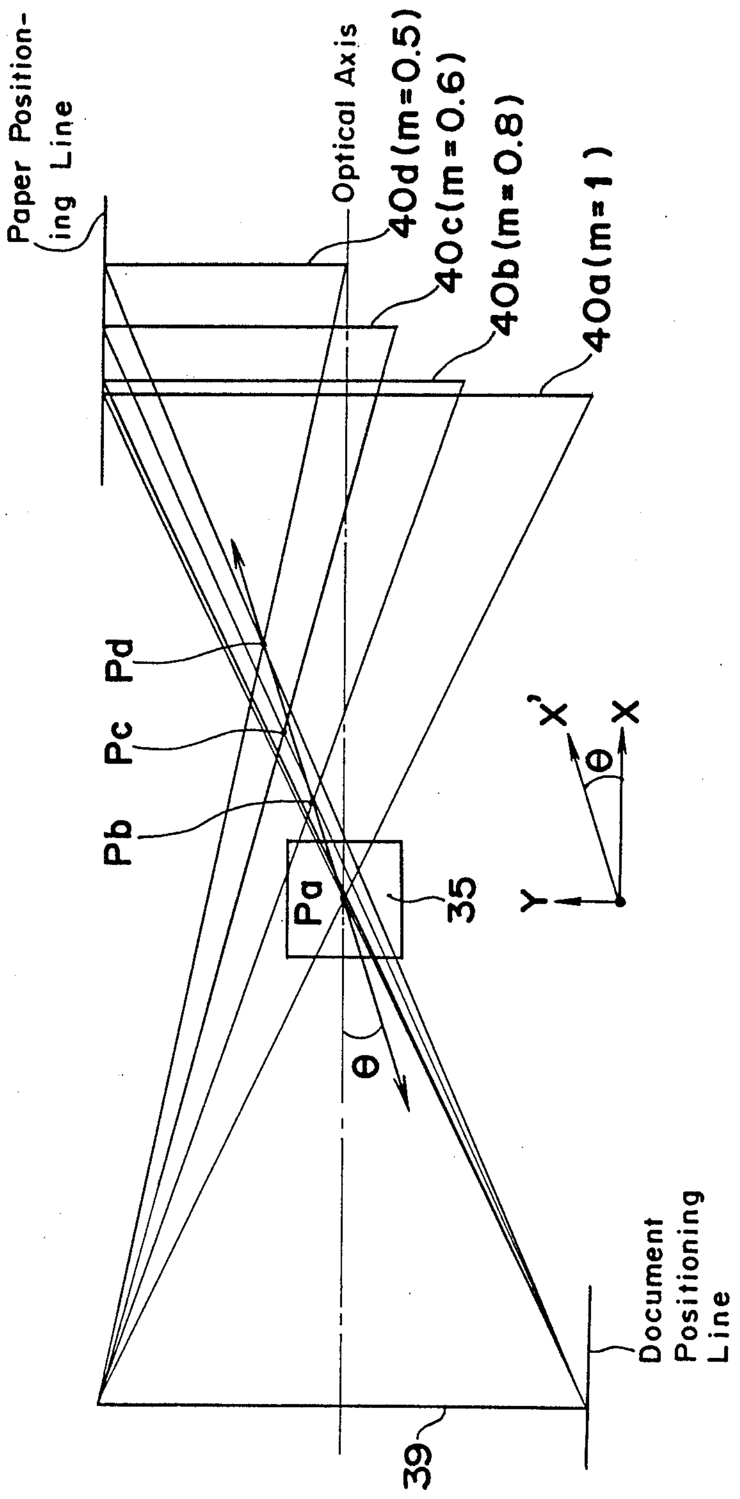
FIG. 5 is a schematic diagram showing an optical system employed in the prior art copying machine, which optical system is shown in developed form to explain how an image can copied onto a copying paper at one of different copying magnifications.

For the exact repositioning of the lens assembly at any one of the lens positions Pa, Pb, Pc and Pd as hereinbefore discussed with reference to FIG. 5, the lens holder 2 has a follower pin shown by the phantom line 8 in FIG. 1. The following pin 8 is rigidly secured to the lens holder 2 and extends in a direction opposite to the lens assembly 1 and is slidingly engaged in a guide groove **9*a* defined in a guide member 9. The guide member 9 is rigidly mounted on the machine framework and positioned between the guide rails 3. The guide groove 9*a* defining the curved path of predetermined configuration as hereinbefore discussed is defined in an upper surface of the guide member 9 and the following pin 8 is slidingly receive therein so that, during the travel of the traction cable 5, the lens holder 2 can be guided in a direction parallel to the direction of the arrow X' while being allowed to be displaced laterally in a direction parallel to the direction of the arrow Y according to the configuration of the curved path. It is to be noted that, when the lens holder 2 is displaced a maximum distance in the direction of the arrow Y, the first and second intermediate portions of the traction cable 5 are laterally yielded to accommodate the lateral displacement of the lens holder 2**.

An extension arm integral with the lens holder 2 and extending outwardly from the cable fixture **4*a* is provided with an photo-interrupter 10 cooperable with an elongated slit plate 11 rigidly mounted on the machine framework. The slit plate 11 is so positioned as to extend in a direction parallel to the direction of the arrow X' so that, during the movement of the lens holder 2, the optical axis of the photo-interrupter 10 can be intercepted. The slit plate 11 is formed with a plurality of slits 11*a* for the passage of the optical axis of the photo-interrupter 10 therethrough when it is aligned with any one of the slits 11*a*. Accordingly, by properly defining the position of each slit 11*a* in the slit plate 11 and by detecting an output from the photo-interrupter 10, the position to which the lens holder 2** is repositioned can be detected.

The drive of the second gear **7*b* coaxial with the drive pulley 6*a* can also be transmitted to a third gear 7*c* meshed with the second gear 7*b*. The third gear 7*c* is in turn meshed with a fourth gear 7*d* rigidly coupled, or otherwise, integrally formed, with a cam member 12 operable to drive a second mirror pair 13 positioned rearwardly of the lens assembly 1 with respect to the direction towards a photoreceptor drum. Where the lens assembly 1 is employed in the form of a zoom lens assembly, however, no mechanism for moving the second mirror pair 13 is necessary and, therefore, the gears 7*c* and 7*d* and the cam member 12** can be dispensed with.

It is to be noted that the follower pulley **6*b* is supported for rotation in a direction counter to the direction of rotation of the drive pulley 6*a*. This follower pulley 6*b* is coaxially coupled with a first follower gear 14*a* which is meshed with a second follower gear 14b mounted on a shaft 15 for rotation together therewith. Although not shown, the shaft 15 extends outwardly from the lens repositioning mechanism and is operatively coupled with a reduction gear device for changing a gear ratio according to the amount of rotation of the shaft 15**. The reduction gear device is arranged in a drive device for effecting the scanning motion of the optical system for changing the scanning speed according to the selected gear ratio.

The lens repositioning mechanism according to the present invention operates in the following manner.

Assuming that an operator of the copying machine manipulates a magnification selector to change the copying magnification, the stepper motor is driven through a predetermined angle to drive the traction cable 5 in one of the opposite directions. As the traction cable 5 is driven, the lens holder 2 with the lens assembly 1 rigidly mounted thereon is moved in the direction of the arrow X' because the first and second intermediate portions of the traction cable 5 are secured to the cable fixtures 4 and **4*a* integral with the lens holder 2 and moved at the same velocity in the same direction. During this movement of the lens holder 2, the lens holder 2 is laterally displaced in the direction of the arrow Y with the follower pin 8 slidingly received in and guided by the guide groove 9*a*. Therefore, the lens assembly 1 on the lens holder 2 can be accurately repositioned at any one of the lens positions, appropriate to the selected copying magnification, along the curved path of predetermined configuration. The lateral displacement of the lens holder 2 which takes place in the manner described above is accommodated by the yielding of each of the first and second intermediate portions of the traction cable 5, that is, the lateral warp of each of the first and second intermediate portions of the traction cable 5 as urged by the lens holder 2**.

The repositioning of the lens holder 2 at one of the lens positions can be detected by the photo-interrupter 10.

Because of the structure and characteristic of the traction cable 5, the rotary drive acting in a direction different from the direction of rotation of the stepper motor can be extracted from the follower pulley **6*b*. The amount of rotation of the drive transmission shaft 15 coupled with the follower pulley 6*b*** corresponds to the selected magnification and, therefore, without relying on any other transmission device, the gear ratio of the reduction gear device is capable of adjusting the scanning speed of the optical system.

From the foregoing description, it has now become clear that the present invention makes it possible for the lens repositioning mechanism to be manufactured at reduced cost and without substantially requiring any precise machining procedure. In addition, since the lens holder is connected to the traction cable by the use of the two-point connection system, the movement of the lens holder having the lens assembly mounted thereon can be stabilized.

Although the present invention has fully been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A lens repositioning device for use in a copying machine of a side-alignment system wherein an original document to be copied is adapted to be placed on a document support with one side edge thereof held in abutting relationship with a reference side edge of the document support, which device comprises:

a generally elongated lens carriage having a lens assembly fixedly mounted thereon;

drive means;

a single traction cable adapted to be driven by the drive means and including generally intermediate first and second cable portions over the length thereof, said first and second cable portions extend generally parallel to each other, said first and second cable portion being, when the traction cable is driven by the drive means, movable at the same velocity in the same direction, said lens carriage being rigidly connected at its opposite ends with the respective portions of the traction cable; and guide means operable during movement of the traction cable accompanied by movement of the lens carriage to guide the lens assembly to follow a curved path of predetermined configuration.

2. The device as claimed in claim 1, wherein said traction cable comprises an elongated core having a synthetic filament turned spirally therearound.

* * * * *